US012068686B2

(12) United States Patent
Zhou

(10) Patent No.: US 12,068,686 B2
(45) Date of Patent: Aug. 20, 2024

(54) SWITCHING CONVERTER COMPATIBLE WITH SUPER CAPACITOR AND CONTROL CIRCUIT THEREOF

(71) Applicant: Chengdu Monolithic Power Systems Co., Ltd., Chengdu (CN)

(72) Inventor: Yong Zhou, Chengdu (CN)

(73) Assignee: Chengdu Monolithic Power Systems Co., Ltd., Sichuan (CN)

( * ) Notice: Subject to any disclaimer, the term of this patent is extended or adjusted under 35 U.S.C. 154(b) by 182 days.

(21) Appl. No.: 17/732,166

(22) Filed: Apr. 28, 2022

(65) Prior Publication Data

US 2022/0368225 A1 Nov. 17, 2022

(30) Foreign Application Priority Data

May 13, 2021 (CN) .......................... 202110524795.6

(51) Int. Cl.
*H02M 3/157* (2006.01)
*H02M 1/00* (2007.01)
*H02M 1/08* (2006.01)

(52) U.S. Cl.
CPC ........... *H02M 3/157* (2013.01); *H02M 1/083* (2013.01); *H02M 1/0041* (2021.05)

(58) Field of Classification Search
CPC ..... H02M 3/158; H02M 1/083; H02M 1/0058
See application file for complete search history.

(56) References Cited

U.S. PATENT DOCUMENTS

| 9,998,009 | B1 | 6/2018 | Lai et al. |
| 10,523,048 | B2 | 12/2019 | Lai et al. |
| 10,892,637 | B2 | 1/2021 | Lu et al. |
| 11,569,728 | B1* | 1/2023 | Van Sloten ........... H02M 3/156 |
| 2011/0215782 | A1* | 9/2011 | Cheng ....................... G05F 1/10 |
| | | | 323/284 |
| 2014/0368174 | A1* | 12/2014 | Houston ................. H02M 1/08 |
| | | | 323/271 |
| 2018/0019671 | A1* | 1/2018 | Li ........................... H02M 1/00 |
| 2018/0367027 | A1* | 12/2018 | Chen ...................... H02M 1/32 |

* cited by examiner

*Primary Examiner* — Sisay G Tiku
(74) *Attorney, Agent, or Firm* — Perkins Coie LLP

(57) ABSTRACT

A control circuit used in a switching converter having a switch and an inductor. The control circuit has an error amplifying circuit, a current comparing circuit, a clock generator and a constant OFF time generator. The error amplifying circuit receives a voltage reference signal and a voltage feedback signal indicative of an output voltage signal, and provides an error signal. The current comparing circuit compares the error signal with a current sensing signal indicative of a current flowing through the inductor, and provides a comparing signal to turn the switch OFF. When the switching converter is coupled to a filtering capacitor, the clock generator provides a clock signal to turn the switch ON, and when the switching converter is coupled to a super capacitor, the clock generator is disabled and the constant OFF time generator provides a constant OFF time signal to turn the switch ON.

20 Claims, 6 Drawing Sheets

SWITCHING CONVERTER COMPATIBLE WITH SUPER CAPACITOR AND CONTROL CIRCUIT THEREOF

CROSS-REFERENCE TO RELATED APPLICATIONS

This application claims the benefit of CN application No. 202110524795.6, filed on May 13, 2021, and incorporated herein by reference.

TECHNICAL FIELD

The present invention generally relates to electronic circuits, and more particularly but not exclusively, to switching converters, associated integrated circuits (ICs) and control circuits.

BACKGROUND

Switching converters are widely used in various industrial fields, which can regulate a voltage and/or a current to be required values by the load via controlling turning-ON and turning-OFF of a power switch. FIG. 1 illustrates a prior art first switching converter 50A. FIG. 2 illustrates a prior art uninterrupted power supply system.

As shown in FIG. 1, an output terminal of the first switching converter 50A is coupled to a filtering capacitor F-cap for filtering. Generally, the filtering capacitor F-cap usually has a capacitance in the micro-farad or nano-farad levels.

As shown in FIG. 2, a first switching converter 50B is used as a backup power supply and is coupled between a bus voltage VBUS and a super capacitor S-cap. When the bus voltage VBUS is normal, the bus voltage VBUS is used to supply power to the first switching converter 50B, while supplying a second switching converter 51 and additional power systems 52 shown in FIG. 2. When the bus voltage VBUS is powered off or is too low, the first switching converter 50B is used to supply power to the second switching converter 51 and the additional power systems 52 so that they can get enough power to work safely, such as saving data or providing an alert. Different from the filtering capacitor F-cap coupled to the first switching converter 50A in FIG. 1, the super capacitor S-cap in FIG. 2 has a capacitance in the farad level. So there are some different requirements and challenges when the first switching converter 50B is coupled to the super capacitor S-cap. It is desired to provide a switching converter and control circuit that can couple to both the filtering capacitor and the super capacitor to satisfy different requirements in practical applications.

SUMMARY

An embodiment of the present invention discloses a control circuit used in a switching converter having a high side switch, a low side switch and an inductor. The switching converter converts an input voltage signal into an output voltage signal at an output terminal by controlling the high side switch and the low side switch. The control circuit comprises an error amplifying circuit, a current comparing circuit, a clock generator and a constant OFF time generator. The error amplifying circuit is configured to receive a voltage reference signal and a voltage feedback signal indicative of the output voltage signal, and to provide an error signal based on the voltage reference signal and the voltage feedback signal. The current comparing circuit is configured to receive the error signal and a current sensing signal indicative of a current flowing through the inductor, and to provide a comparing signal to turn the high side switch OFF based on the error signal and the current sensing signal. When the output terminal of the switching converter is coupled to a super capacitor, the clock generator is disabled, and the constant OFF time generator is enabled and configured to provide a constant OFF time signal to turn the high side switch ON. And when the output terminal of the switching converter is coupled to a filtering capacitor, the constant OFF time generator is disabled, and the clock generator is enabled and configured to provide a clock signal to turn the high side switch ON.

An embodiment of the present invention discloses a switching converter. The switching converter comprises a switching circuit having a high side switch, a low side switch and an inductor, an error amplifying circuit, a current comparing circuit, a clock generator and a constant OFF time generator. An input voltage signal is converted into an output voltage signal at an output terminal by controlling the high side switch and the low side switch. The error amplifying circuit is configured to receive a voltage reference signal and a voltage feedback signal indicative of the output voltage signal, and to provide an error signal based on the voltage reference signal and the voltage feedback signal. The current comparing circuit is configured to receive the error signal and a current sensing signal indicative of a current flowing through the inductor, and to provide a comparing signal to turn the high side switch OFF based on the error signal and the current sensing signal. When the output terminal of the switching converter is coupled to a super capacitor, the clock generator is disabled, and the constant OFF time generator is enabled and configured to provide a constant OFF time signal to turn the high side switch ON. And when the output terminal of the switching converter is coupled to a filtering capacitor, the constant OFF time generator is disabled, and the clock generator is enabled and configured to provide a clock signal to turn the high side switch ON.

An embodiment of the present invention discloses an integrated circuit, comprising: an input pin configured to receive an input voltage signal, an output pin configured to provide an output voltage signal, a high side switch, a low side switch, an error amplifying circuit, a current comparing circuit, a clock generator and a constant OFF time generator. The error amplifying circuit is configured to receive a voltage reference signal and a voltage feedback signal indicative of the output voltage signal, and to provide an error signal based on the voltage reference signal and the voltage feedback signal. The current comparing circuit is configured to receive the error signal and a current sensing signal indicative of a current flowing through the output pin, and to provide a comparing signal to turn the high side switch OFF based on the error signal and the current sensing signal. When the output terminal of the switching converter is coupled to a super capacitor, the clock generator is disabled, and the constant OFF time generator is enabled and configured to provide a constant OFF time signal to turn the high side switch ON. And when the output terminal of the switching converter is coupled to a filtering capacitor, the constant OFF time generator is disabled, and the clock generator is enabled and configured to provide a clock signal to turn the high side switch ON.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element.

Figure 1:
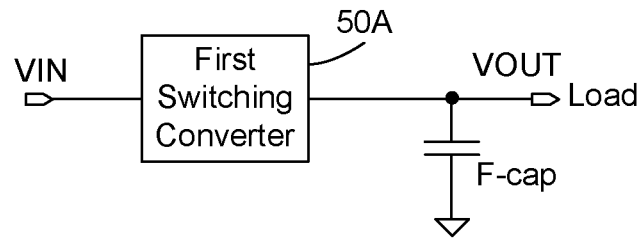
FIG. 1 illustrates a prior art first switching converter 50A.
Figure 2:
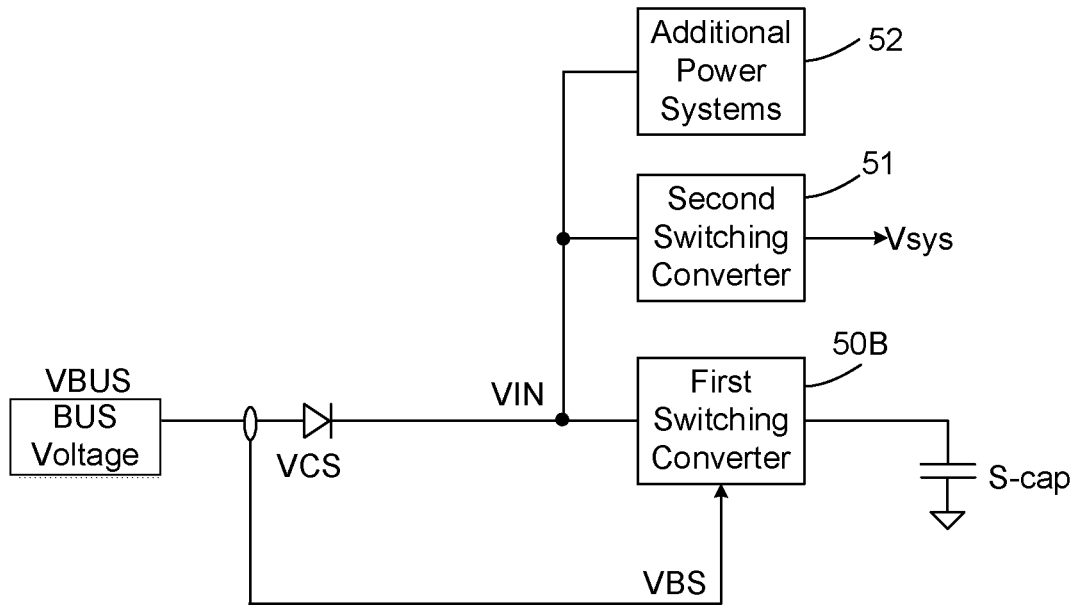
FIG. 2 illustrates a prior art uninterrupted power supply system.
Figure 3:
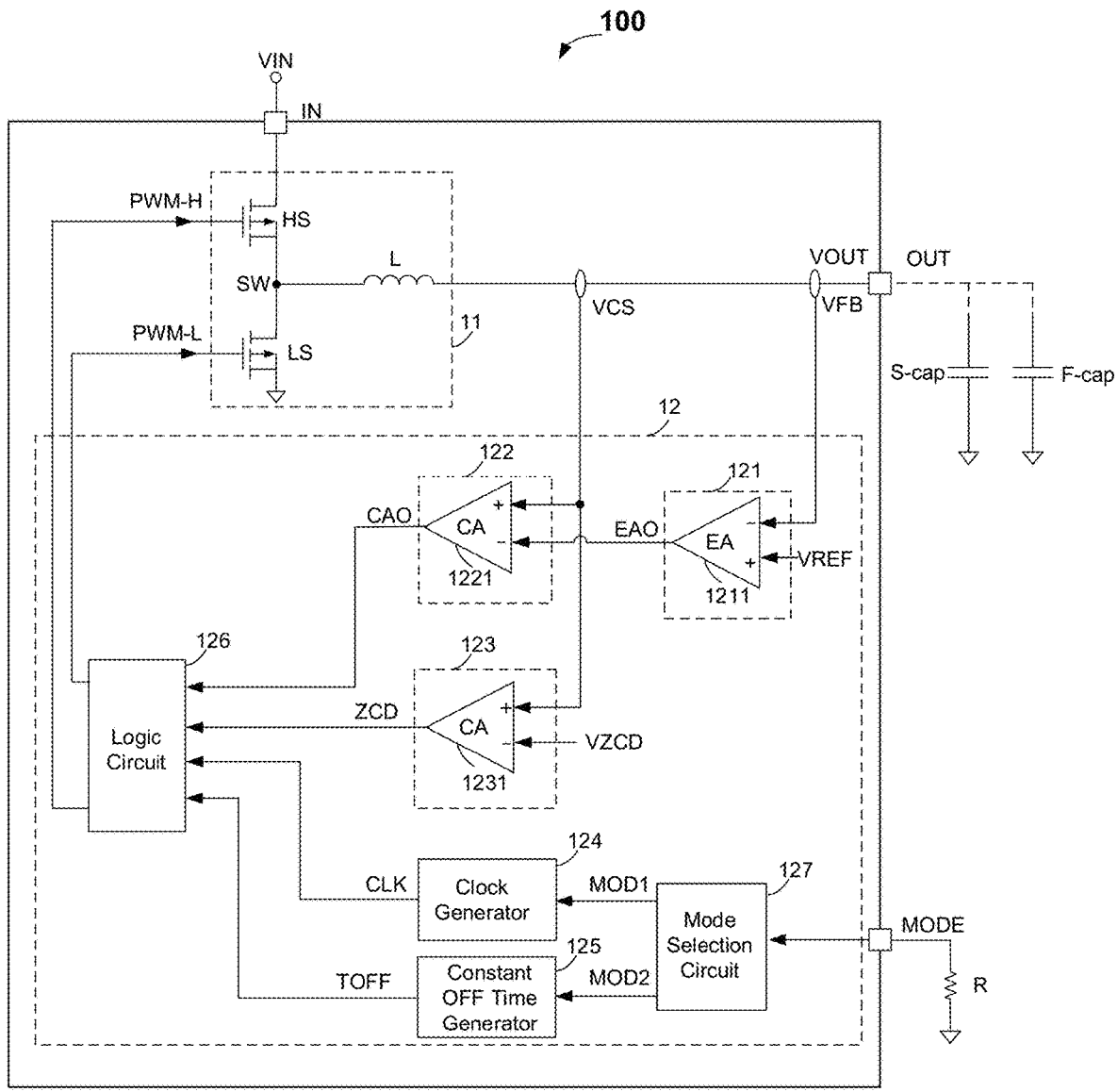
FIG. 3 schematically illustrates a switching converter 100 in accordance with an embodiment of the present invention.

FIG. 3 schematically illustrates a switching converter 100 in accordance with an embodiment of the present invention. As shown in FIG. 3, the switching converter 100 comprises a switching circuit 11, a capacitor (S-cap or F-cap) and a control circuit 12. The switching circuit 11 has a high side switch HS, a low side switch LS and an inductor L. The switching converter 100 converts an input voltage signal VIN at an input terminal IN into an output voltage signal VOUT at an output terminal OUT via turning ON and OFF of the high side switch HS and the low side switch LS. The capacitor (S-cap or F-cap) is coupled to the output terminal OUT of the switching converter 100. Based on practical applications, the capacitor (S-cap or F-cap) can be a filtering capacitor F-cap having a capacitance lower than the farad level, or a super capacitor S-cap having a capacitance in the farad level, as shown in FIG. 3. Those skilled in the art can understand that which one of the filtering capacitor F-cap and the super capacitor S-cap will be coupled to the output terminal OUT of the switching converter 100 depends on specific application. In one embodiment, "lower than the farad level" refers that the capacitance can be in the micro-farad level, nano-farad level, pico-farad level or a much lower value. In the example shown in FIG. 3, the switching circuit 11 takes BUCK topology as an example for illustration. In other embodiments, the switching circuit 11 can be configured in other suitable topologies, such as BOOST and so on. In the example shown in FIG. 3, the high side switch HS and the low side switch LS are both shown as MOSFETs. In other embodiment, the high side switch HS and the low side switch LS can be any controllable semiconductor device, such as JFET, IGBT, and so on.

The control circuit 12 comprises an error amplifying circuit 121, a current comparing circuit 122, a zero-crossing comparing circuit 123, a clock generator 124, a constant OFF time generator 125 and a logic circuit 126.

In the example shown in FIG. 3, the error amplifying circuit 121 has a first input terminal, a second input terminal and an output terminal, wherein the first input terminal is configured to receive a voltage feedback signal VFB indicative of the output voltage signal VOUT, and the second input terminal is configured to receive a voltage reference signal VREF. The error amplifying circuit 121 is configured to compare the voltage feedback signal VFB with the voltage reference signal VREF, and provide an error signal EAO at the output terminal. In one embodiment, the error amplifying circuit 121 comprises an error amplifier 1211 having a non-inverting input terminal and an inverting input terminal, wherein the non-inverting input terminal is configured to receive the voltage reference signal VREF and the inverting input terminal is configured to receive the voltage feedback signal VFB.

The current comparing circuit 122 has a first input terminal, a second input terminal and an output terminal, wherein the first input terminal is configured to receive the error signal EAO, and the second input terminal is configured to receive a current sensing signal VCS indicative of a current flowing through the switching converter 100. In one embodiment, the current sensing signal VCS represents a current flowing through the inductor L and can be obtained by sensing an inductor current flowing through the inductor L, a high side switch current flowing through the high side switch HS or a low side switch current flowing through the low side switch LS. Actually, the inductor current is equal to the high side switch current when the high side switch HS is turned ON, and is equal to the low side switch current when the low side switch LS is turned ON. The current comparing circuit 122 is configured to compare the error signal EAO with the current sensing signal VCS, and provide a comparing signal CAO at the output terminal. In one embodiment, the comparing signal CAO comprises a logic high/low signal. In one embodiment, the comparing signal CAO is configured to determine the turning-OFF of the high side switch HS and the turning-ON of the low side switch LS. For example, when the comparing signal CAO changes into logic high from logic low, the high side switch HS is turned OFF, and the low side switch LS is turned ON. In one embodiment, the current comparing circuit 122 comprises a voltage comparator 1221 having a non-inverting input terminal and an inverting input terminal, wherein the non-inverting input terminal is configured to receive the current sensing signal VCS and the inverting input terminal is configured to receive the error signal EAO.

The zero-crossing comparing circuit 123 has a first input terminal, a second input terminal and an output terminal, wherein the first input terminal is configured to receive a zero-crossing threshold signal VZCD, and the second input terminal is configured to receive the current sensing signal VCS. The zero-crossing comparing circuit 123 is configured to compare the zero-crossing threshold signal VZCD with the current sensing signal VCS, and provide a zero-crossing indication signal ZCD at the output terminal. In one embodiment, the zero-crossing indication signal ZCD comprises a logic high/low signal. In one embodiment, the zero-crossing indication signal ZCD is configured to turn the low side switch LS OFF when the current sensing signal VCS decreases to the zero-crossing threshold signal VZCD. For example, when the zero-crossing indication signal ZCD changes into logic valid state (e.g., logic low) from logic invalid state (e.g., logic high), the low side switch LS is turned OFF. In one embodiment, the zero-crossing comparing circuit 123 comprises a voltage comparator 1231 having a non-inverting input terminal and an inverting input terminal, wherein the non-inverting input terminal is configured to receive the current sensing signal VCS and the inverting input terminal is configured to receive the zero-crossing threshold signal VZCD.

In one embodiment, when the output terminal OUT of the switching converter 100 is coupled to the filtering capacitor F-cap, the control circuit 12 is configured to work in a first mode. The control circuit 12 enables the clock generator 124 to generate a clock signal CLK, wherein the frequency of the clock signal CLK determines the working frequency of the switching converter 100. In one embodiment, the clock signal CLK determines the turning-ON of the high side switch HS.

It should be noted that when the output terminal OUT of the switching converter 100 is coupled to the filtering capacitor F-cap, since the capacitance of the filtering capacitor F-cap is low, during a startup stage (normally several milliseconds), the switching converter 100 can regulate the inductor current by adjusting the voltage reference signal VREF of the error amplifying circuit 121 through a soft start circuit, so as to avoid system damage caused by high current.

However, when the output terminal OUT of the switching converter 100 is coupled to the super capacitor S-cap, on one hand, the capacitance of the super capacitor S-cap is high. On the other hand, in the application of backup power supply, the bus voltage must supply power to system load and additional power systems firstly, thus the charging power provided to the super capacitor S-cap may not be high enough such that the charging time for the super capacitor S-cap will be too long. For example, if the system voltage to the load is 12V, charging a super capacitor S-cap having a capacitance of 7~10 F to 2.6V will need 10~15 minutes. During the charging, a voltage across the super capacitor S-cap will remain low for such a long time. Accordingly, the rising slope of the inductor current is too large while the falling slope of the inductor current is too small. The soft start circuit with duration of only several milliseconds cannot play the role of current limiting protection. Thus the method of determining the turning-ON of the high side switch HS by the clock signal with fixed frequency may not be suitable when the switching converter 100 is coupled to the super capacitor S-cap.

To solve the problem mentioned above, when the output terminal OUT of the switching converter 100 is coupled to the super capacitor S-cap, the control circuit 12 is configured to work in a second mode. In the second mode, the control circuit 12 enables the constant OFF time generator 125 to provide a constant OFF time signal TOFF, at the same time, the clock generator 124 is disabled. In one embodiment, the constant OFF time signal TOFF comprises a logic high/low signal. In one embodiment, the constant OFF time signal TOFF is configured to determine the turning-ON of the high side switch HS. For example, when the constant OFF time signal TOFF changes into logic high from logic low, the high side switch HS is turned ON. In one embodiment, the duration of the constant OFF time signal TOFF maintaining logic low in a switching cycle is its valid time, in other words, the valid time is the constant OFF time of the high side switch HS.

The logic circuit 126 is configured to receive the comparing signal CAO, the zero-crossing indication signal ZCD, the clock signal CLK and the constant OFF time signal TOFF, and provide a high side control signal PWM-H and a low side control signal PWM-L to respectively control the high side switch HS and the low side switch LS based thereupon.

In one embodiment, the control circuit 12 further comprises a mode selection circuit 127. The mode selection circuit 127 is configured to provide a first mode signal MOD1 and a second mode signal MOD2 based on an instruction from a user, wherein the first mode signal MOD1 is configured to enable or disable the clock generator 124, and the second mode signal MOD2 is configured to enable or disable the constant OFF time generator 125. In one embodiment, the first mode signal MOD1 and the second mode signal MOD2 are complementary logic signals, i.e., when the clock generator 124 is enabled, the constant OFF time generator 125 is disabled, and vice versa. In one embodiment, the mode selection circuit 127 comprises one time programmable (OTP) circuit so that the user can select the working mode of the control circuit 12.

In one embodiment, except for the capacitor (filtering capacitor F-cap or super capacitor S-cap), the high side switch HS, the low side switch LS, the inductor L, the error amplifying circuit 121, the current comparing circuit 122, the zero-crossing comparing circuit 123, the clock generator 124, the constant OFF time generator 125, the logic circuit 126 and the mode selection circuit 127 all can be integrated in a single IC, wherein the IC can be a digital IC, an analog IC or a digital-analog IC. In one embodiment, the IC comprises an input pin IN configured to receive the input voltage signal VIN, an output pin configured to provide the output voltage signal VOUT and a mode selection pin MODE. In one embodiment, the mode selection circuit 127 is coupled to the mode selection pin MODE inside the IC, and a mode setting resistor R is coupled to the mode selection pin MODE outside the IC. The state of the first mode signal MOD1 and the second mode signal MOD2 can be determined by the resistance of the mode setting resistor.

Figure 4:
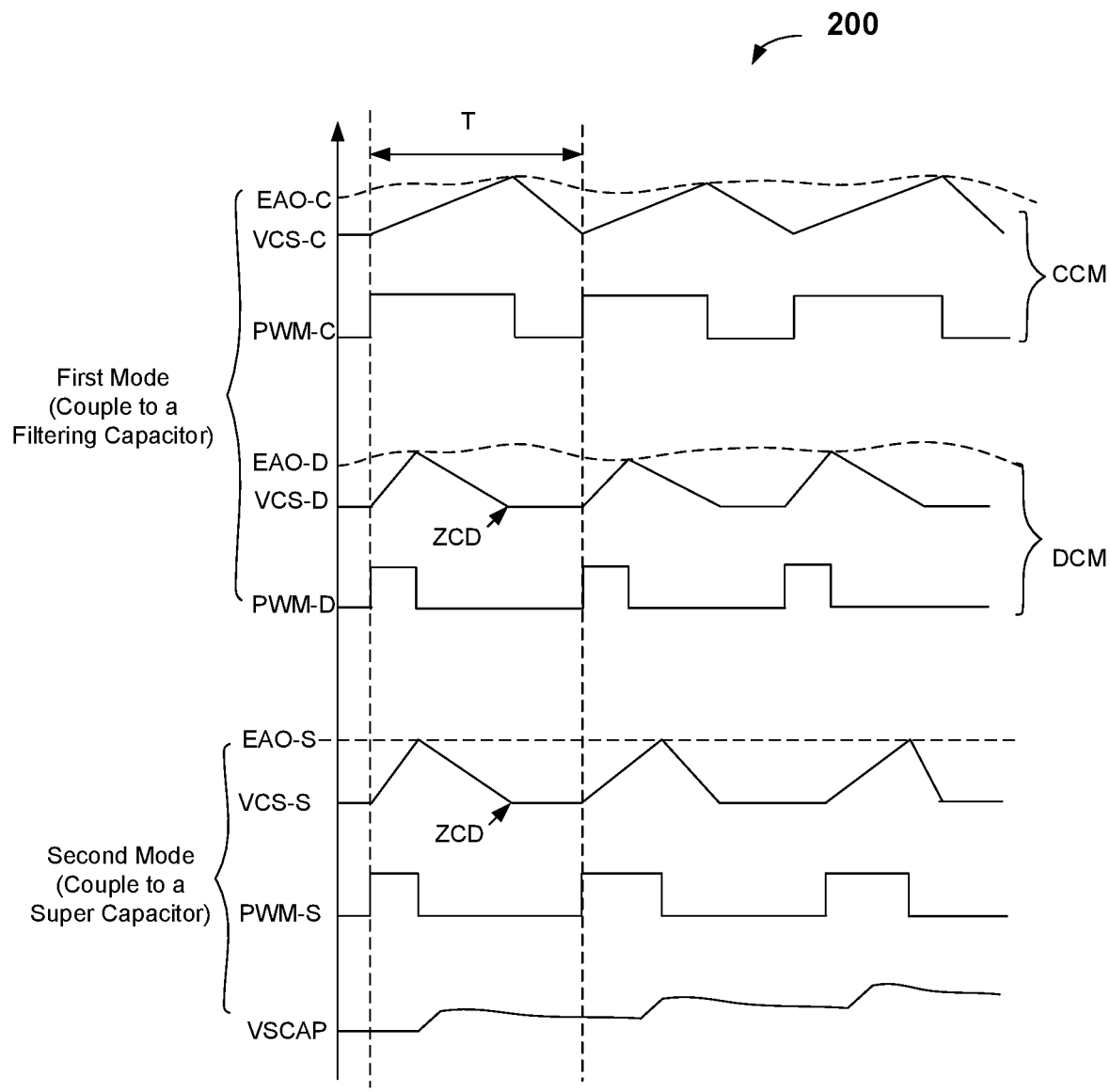
FIG. 4 illustrates waveforms 200 in the first mode and the second mode, in accordance with an embodiment of the present invention.

FIG. 4 illustrates waveforms 200 in the first mode and the second mode, in accordance with an embodiment of the present invention. As shown in FIG. 4, the waveforms 200 comprises the error signal EAO-C, EAO-D, EAO-S, the current sensing signal VCS-C, VCS-D, VCS-S, the high side control signal PWM-C, PWM-D, PWM-S, and the super capacitor voltage signal VSCAP.

In the first mode, the output terminal OUT of the switching converter 100 is coupled to the filtering capacitor F-cap, and the waveforms include EAO-C, VCS-C, and PWM-C in continuous current mode (CCM), and EAO-D, VCS-D, and PWM-D in discontinuous current mode (DCM).

In the second mode, the output terminal OUT of the switching converter 100 is coupled to the super capacitor S-cap, and the waveforms include EAO-S, VCS-S, PWM-S and VSCAP.

Next, the working principle of the switching converter 100 will be described in detail referring to FIG. 3 and FIG. 4.

When the output terminal OUT of the switching converter 100 is coupled to the filtering capacitor F-cap, i.e., the control circuit 12 works in the first mode, the working frequency of the switching converter 100 is constant. The error signal EAO changes with the output voltage signal VOUT. The switching converter 100 can work in CCM or DCM based on the load coupled to the filtering capacitor F-cap in practical applications. In CCM, the turning-OFF of the low side switch LS is determined by the clock signal CLK. In DCM, the turning-OFF of the low side switch LS is determined by the zero-crossing indication signal ZCD.

When the output terminal OUT of the switching converter 100 is coupled to the super capacitor S-cap, i.e., the control circuit 12 works in the second mode, the super capacitor S-cap is the load of the switching converter 100, in other words, there are no other loads coupled to the switching converter 100. The voltage feedback signal VFB represents the super capacitor voltage signal VSCAP. The OFF time of the high side switch HS is constant, while the switching frequency of the switching converter 100 is changeable. The capacitance of the super capacitor S-cap is very high and the charging time of the super capacitor S-cap is very long. In the early stage of charging the super capacitor S-cap, since the super capacitor voltage signal VSCAP is far lower than a reference value, i.e., the voltage feedback signal VFB is far lower than the voltage reference signal VREF, the error signal EAO is always high and does not contribute to the regulation of the control loop. Furthermore, in the initial stage of charging the super capacitor S-cap, the super capacitor voltage signal VSCAP is very low and almost close to zero, thus the inductor current decreases very slowly, and the inductor current cannot decrease to zero during the OFF time of the high side switch HS. Because there is no load coupled to the super capacitor S-cap, the required inductor current is not high. At the same time, in order to avoid the inductor current rising too fast in the next continuous switching cycles, the switching converter 100 is configured to work in DCM, and the turning-OFF of the low side switch LS is determined by the zero-crossing indication signal ZCD.

Figure 5:
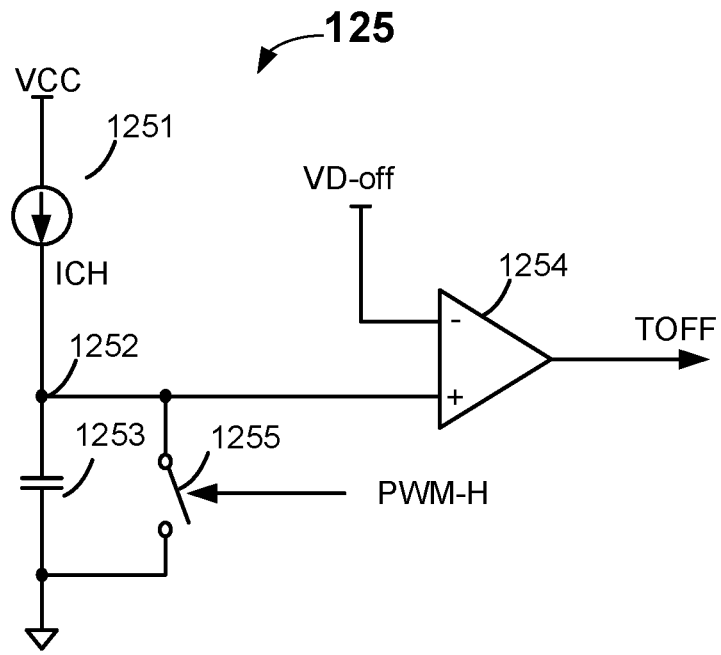
FIG. 5 illustrates a constant OFF time generator 125 shown in FIG. 3, in accordance with an embodiment of the present invention.

FIG. 5 illustrates a constant OFF time generator 125 shown in FIG. 3, in accordance with an embodiment of the present invention. The constant OFF time generator 125 comprises a current source 1251, a charge-and-discharge capacitor 1253, a voltage comparator 1254 and a reset switch 1255. The current source 1251 and the charge-and-discharge capacitor 1253 are coupled in series between a supply voltage signal VCC and a reference ground, wherein a common node of the current source 1251 and the charge-and-discharge capacitor 1253 is labeled as the node 1252. The voltage comparator 1254 has a first input terminal, a second input terminal and an output terminal, wherein the first input terminal is configured to receive a reference voltage signal VD-off, and the second input terminal is coupled to the node 1252 to receive a voltage across the charge-and-discharge capacitor 1253. The voltage comparator 1254 is configured to compare the reference voltage signal VD-off with the voltage across the charge-and-discharge capacitor 1253, and provide the constant OFF time signal TOFF. The reset switch 1255 has a first terminal, a second terminal and a control terminal, wherein the first terminal is coupled to the node 1252, the second terminal is coupled to the reference ground, and the control terminal is configured to receive the high side control signal PWM-H. In one embodiment, when the high side switch HS is turned OFF by the high side control signal PWM-H, the high side control signal PWM-H turns the reset switch 1255 OFF, and the current source 1251 starts to provide a current signal ICH to charge the charge-and-discharge capacitor 1253.

Figure 6:
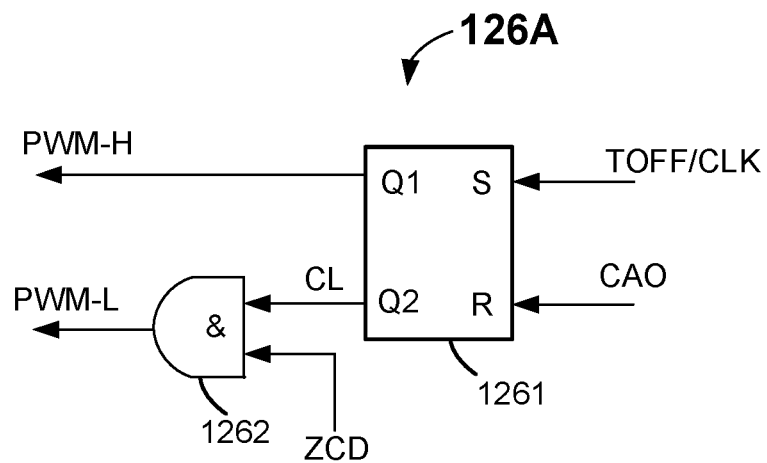
FIG. 6 illustrates a logic circuit 126A shown in FIG. 3, in accordance with an embodiment of the present invention.

FIG. 6 illustrates a logic circuit 126A shown in FIG. 3, in accordance with an embodiment of the present invention. As shown in FIG. 6, the logic circuit 126A comprises a RS flip-flop 1261 and an AND gate 1262.

When the output terminal OUT of the switching converter 100 is coupled to the filtering capacitor F-cap, i.e., the control circuit 12 works in the first mode, a set terminal S of the RS flip-flop 1261 is configured to receive the clock signal CLK, and a reset terminal R of the RS flip-flop 1261 is configured to receive the comparing signal CAO. The RS flip-flop 1261 is configured to provide the high side control signal PWM-H at a first output terminal Q1 and a low-side switch control signal CL at a second output terminal Q2. The AND gate 1262 is configured to receive the low-side switch control signal CL and the zero-crossing indication signal ZCD, and provide the low side control signal PWM-L based thereupon.

When the output terminal OUT of the switching converter 100 is coupled to the super capacitor S-cap, i.e., the control circuit 12 works in the second mode, the set terminal S of the RS flip-flop 1261 is configured to receive the constant OFF time signal TOFF, and the reset terminal R of the RS flip-flop 1261 is configured to receive the comparing signal CAO. The RS flip-flop 1261 is configured to provide the high side control signal PWM-H at the first output terminal Q1 and the low-side switch control signal CL at the second output terminal Q2. The AND gate 1262 is configured to receive the low-side switch control signal CL and the zero-crossing indication signal ZCD, and provide the low side control signal PWM-L based thereupon.

As aforementioned, the turning-OFF of the low side switch LS is determined by the zero-crossing indication signal ZCD to avoid over-current of the inductor current. In these occasions, if the zero-crossing threshold signal VZCD goes negative, for example caused by offset, then the low side switch LS will maintain ON until the inductor current reversely increases to the zero-crossing threshold signal VZCD. However, since the super capacitor voltage VSCAP is almost close to zero during the initial state of charging the super capacitor, the inductor current hardly flows in a reverse direction and increases to the zero-crossing threshold signal VZCD. Therefore, the low side switch LS cannot be turned OFF even if the constant OFF time of the high side switch HS has already ended. As a result, the charging stage of the super capacitor will be stuck. To solve the problem, a further embodiment will be set forth next.

Figure 7:
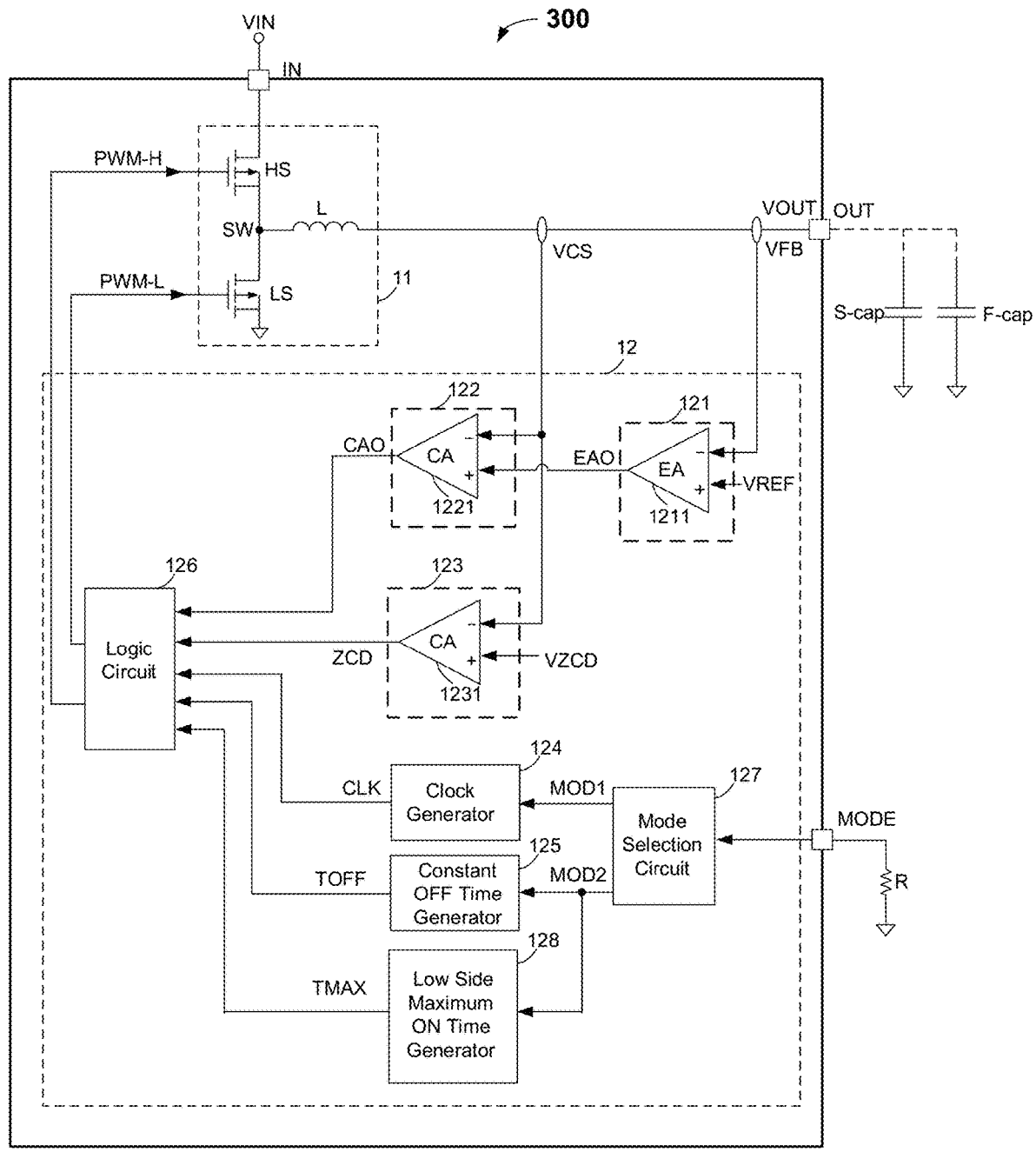
FIG. 7 illustrates a switching converter 300 in accordance with another embodiment of the present invention.

FIG. 7 illustrates a switching converter 300 in accordance with another embodiment of the present invention. Compared with the switching converter 100, the switching converter 300 further comprises a low side maximum ON time generator 128. When the output terminal OUT of the switching converter 300 is coupled to the super capacitor S-cap, i.e., the control circuit 12 works in the second mode, the low side maximum ON time generator 128 is enabled and configured to generate a low side maximum ON time signal TMAX. In one embodiment, the low side maximum ON time signal TMAX comprises a logic high/low signal. In one embodiment, the low side maximum ON time signal TMAX is configured to determine the turning-OFF of the low side switch LS. For example, when the low side maximum ON time signal TMAX changes into logic valid state (e.g., logic low) from logic invalid state (e.g., logic high), the low side switch LS is turned OFF. In one embodiment, the duration of the low side maximum ON time signal TMAX maintaining logic high in a switching cycle is its valid time, in other words, the valid time is the ON time of the low side switch LS. In one embodiment, when any of the low side maximum ON time signal TMAX and the zero-crossing indication signal ZCD is in logic valid state, the low side switch LS is turned OFF.

In the switching converter 300 shown in FIG. 7, even if the zero-crossing indication signal ZCD cannot turn the low side switch LS OFF, the low side switch LS can be turned OFF by the low side maximum ON time signal TMAX.

Similar to the switching converter 100, the high side switch HS, the low side switch LS, the inductor L, the error amplifying circuit 121, the current comparing circuit 122, the zero-crossing comparing circuit 123, the clock generator 124, the constant OFF time generator 125, the logic circuit 126, the mode selection circuit 127 and the low side maximum ON time generator 128 can be integrated in a single IC, wherein the IC can be a digital IC, an analog IC or a digital-analog IC.

Figure 8:
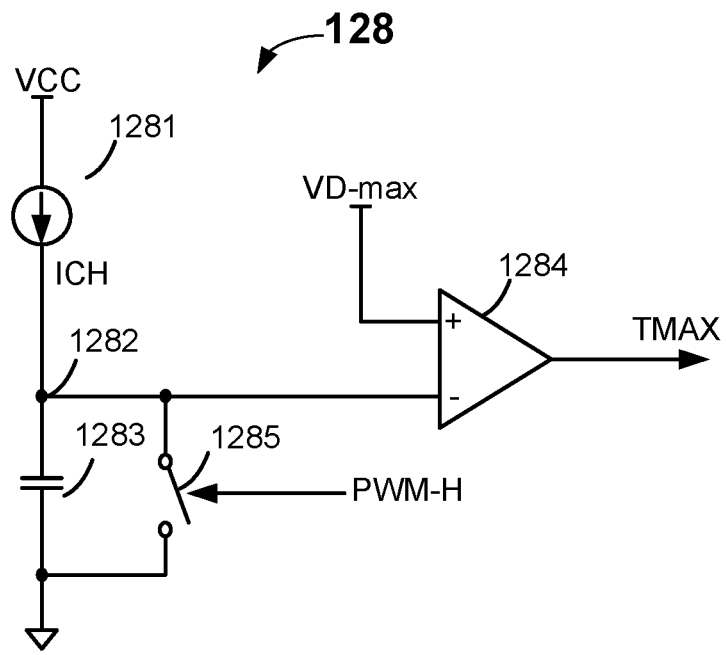
FIG. 8 illustrates a low side maximum ON time generator 128 shown in FIG. 7, in accordance with an embodiment of the present invention.

FIG. 8 illustrates a low side maximum ON time generator 128 shown in FIG. 7, in accordance with an embodiment of the present invention. As shown in FIG. 8, the low side maximum ON time generator 128 is similar to the constant OFF time generator 125, and comprises a current source 1281, a charge-and-discharge capacitor 1283, a voltage comparator 1284 and a reset switch 1285. Compared with the constant OFF time generator 125, the difference is that a non-inverting input terminal of the voltage comparator 1284 is configured to receive a reference voltage signal VD-max, which is different from the reference voltage signal VD-off in the constant OFF time generator 125. In one embodiment, the valid time of the low side maximum ON time signal TMAX is smaller than the valid time of the constant OFF time signal TOFF. In one embodiment, the reference voltage signal VD-max is configured to be lower than the reference voltage signal VD-off, so that the valid time of the low side maximum ON time signal TMAX is smaller than the valid time of the constant OFF time signal TOFF.

Figure 9:
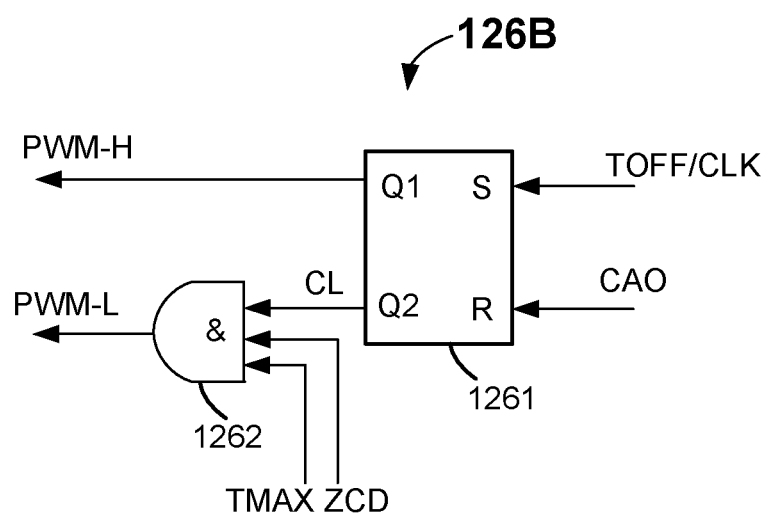
FIG. 9 illustrates a logic circuit 126B shown in FIG. 7, in accordance with an embodiment of the present invention.

FIG. 9 illustrates a logic circuit 126B shown in FIG. 7, in accordance with an embodiment of the present invention. The logic circuit 126B comprises a RS flip-flop 1261 and an AND gate 1262. Compared with the logic circuit 126A shown in FIG. 6, the logic circuit 126B shown in FIG. 9 is further configured to receive the low side maximum ON time signal TMAX.

When the output terminal OUT of the switching converter 300 is coupled to the filtering capacitor F-cap, i.e., the control circuit 12 works in the first mode, the set terminal S of the RS flip-flop 1261 is configured to receive the clock signal CLK, and the reset terminal R of the RS flip-flop 1261 is configured to receive the comparing signal CAO. The RS flip-flop 1261 is configured to provide the high side control signal PWM-H at the first output terminal Q1 and the low-side switch control signal CL at the second output terminal Q2. The AND gate 1262 is configured to receive the low-side switch control signal CL and the zero-crossing indication signal ZCD, and provide the low side control signal PWM-L based thereupon.

When the output terminal OUT of the switching converter 300 is coupled to the super capacitor S-cap, i.e., the control circuit 12 works in the second mode, the set terminal S of the RS flip-flop 1261 is configured to receive the constant OFF time signal TOFF, and the reset terminal R of the RS flip-flop 1261 is configured to receive the comparing signal CAO. The RS flip-flop 1261 is configured to provide the high side control signal PWM-H at the first output terminal Q1 and the low-side switch control signal CL at the second output terminal Q2. The AND gate 1262 is configured to receive the low-side switch control signal CL, the zero-crossing indication signal ZCD and the low side maximum ON time signal TMAX, and provide the low side control signal PWM-L based thereupon.

Although many detailed circuits are shown in the embodiments above, it is apparent to persons of ordinary skills in the art that, these detailed circuits are only used for illustration purpose only, and are not intended to limit the present invention. Other suitable circuit structure with same or similar function could also be utilized. Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A control circuit used in a switching converter having a high side switch, a low side switch and an inductor, wherein the switching converter converts an input voltage signal into an output voltage signal at an output terminal by controlling the high side switch and the low side switch, the control circuit comprising: an error amplifying circuit configured to receive a voltage reference signal and a voltage feedback signal indicative of the output voltage signal, and to provide an error signal based on the voltage reference signal and the voltage feedback signal; a current comparing circuit configured to receive the error signal and a current sensing signal indicative of a current flowing through the inductor, and to provide a comparing signal to turn the high side switch OFF based on the error signal and the current sensing signal; a clock generator; and a constant OFF time generator; and wherein when the output terminal of the switching converter is coupled to a super capacitor, the clock generator is disabled, and the constant OFF time generator is enabled and configured to provide a constant OFF time signal to turn the high side switch ON; and wherein when the output terminal of the switching converter is coupled to a filtering capacitor, the constant OFF time generator is disabled, and the clock generator is enabled and configured to provide a clock signal to turn the high side switch ON; and wherein a value of the super capacitor is greater than one farad and a value of the filter capacitor is less than one farad.

2. The control circuit of claim 1, further comprising:
a zero-crossing comparing circuit configured to receive a zero-crossing threshold signal and the current sensing signal, and to provide a zero-crossing indication signal to turn the low side switch OFF based on the zero-crossing threshold signal and the current sensing signal.

3. The control circuit of claim 2, further comprising:
a low side maximum ON time generator, wherein when the output terminal of the switching converter is coupled to the super capacitor, the low side maximum ON time generator is enabled and configured to generate a low side maximum ON time signal to turn the low side switch OFF.

4. The control circuit of claim 3, wherein when either of the zero-crossing indication signal and the low side maximum ON time signal is in a logic valid state, the low side switch is turned OFF.

5. The control circuit of claim 3, further comprising:
a logic circuit configured to receive the comparing signal, the zero-crossing indication signal, the clock signal, the constant OFF time signal and the low side maximum ON time signal, and to provide a high side control signal and a low side control signal to respectively control the high side switch and the low side switch.

6. The control circuit of claim 5, wherein the logic circuit comprising:
a RS flip-flop having a set terminal, a reset terminal, a first output terminal and a second output terminal, wherein the set terminal is configured to receive the clock signal or the constant OFF time signal, the reset terminal is configured to receive the comparing signal, the RS flip-flop is configured to provide the high side control signal at the first output terminal and a low-side switch control signal at the second output terminal; and
an AND gate configured to receive the low-side switch control signal, the zero-crossing indication signal and the low side maximum ON time signal, and provide the low side control signal based on the low-side switch control signal, the zero-crossing indication signal and the low side maximum ON time signal.

7. The control circuit of claim 5, wherein the low side maximum ON time generator comprising:
a current source configured to receive a supply voltage signal and to provide a current signal;
a capacitor having a first terminal and a second terminal, wherein the first terminal is coupled to the current source, and the second terminal is coupled to a reference ground;
a switch having a first terminal, a second terminal and a control terminal, wherein the first terminal is coupled to a common node of the current source and the capacitor, the second terminal is coupled to the reference ground, and the control terminal is configured to receive the high side control signal; and
a comparator having a first input terminal, a second input terminal and an output terminal, wherein the first input terminal is configured to receive a reference voltage signal, and the second input terminal is coupled to the first terminal of the capacitor, the voltage comparator is configured to compare the reference voltage signal with a voltage across the capacitor, and provide the low side maximum ON time signal based on the reference voltage signal and the voltage across the capacitor.

8. The control circuit of claim 1, further comprising:
a mode selection circuit configured to provide a first mode signal and a second mode signal, wherein the first mode signal is configured to enable or disable the clock generator, and the second mode signal is configured to enable or disable the constant OFF time generator.

9. A switching converter, comprising: a switching circuit having a high side switch, a low side switch and an inductor, wherein an input voltage signal is converted into an output voltage signal at an output terminal by controlling the high side switch and the low side switch; an error amplifying circuit configured to receive a voltage reference signal and a voltage feedback signal indicative of the output voltage signal, and to provide an error signal based on the voltage reference signal and the voltage feedback signal; a current comparing circuit configured to receive the error signal and a current sensing signal indicative of a current flowing through the inductor, and to provide a comparing signal to turn the high side switch OFF based on the error signal and the current sensing signal; a clock generator; and a constant OFF time generator; and wherein when the output terminal of the switching converter is coupled to a super capacitor, the clock generator is disabled, and the constant OFF time generator is enabled and configured to provide a constant OFF time signal to turn the high side switch ON; and wherein when the output terminal of the switching converter is coupled to a filtering capacitor, the constant OFF time generator is disabled, and the clock generator is enabled and configured to provide a clock signal to turn the high side switch ON; and wherein a value of the super capacitor is greater than one farad and a value of the filter capacitor is less than one farad.

10. The switching converter of claim 9, further comprising:
a zero-crossing comparing circuit configured to receive a zero-crossing threshold signal and the current sensing signal, and to provide a zero-crossing indication signal to turn the low side switch OFF based on the zero-crossing threshold signal and the current sensing signal.

11. The switching converter of claim 10, further comprising:
a low side maximum ON time generator, wherein when the output terminal of the switching converter is coupled to the super capacitor, the low side maximum ON time generator is enabled and configured to generate a low side maximum ON time signal to turn the low side switch OFF.

12. The switching converter of claim 11, wherein when either of the zero-crossing indication signal and the low side maximum ON time signal is in a logic valid state, the low side switch is turned OFF.

13. The switching converter of claim 11, further comprising:
a logic circuit configured to receive the comparing signal, the zero-crossing indication signal, the clock signal, the constant OFF time signal and the low side maximum ON time signal, and to provide a high side control signal and a low side control signal to respectively control the high side switch and the low side switch.

14. The switching converter of claim 13, wherein the logic circuit comprising:
a RS flip-flop having a set terminal, a reset terminal, a first output terminal and a second output terminal, wherein the set terminal is configured to receive the clock signal or the constant OFF time signal, the reset terminal is configured to receive the comparing signal, the RS flip-flop is configured to provide the high side control signal at the first output terminal and a low-side switch control signal at the second output terminal; and
an AND gate configured to receive the low-side switch control signal, the zero-crossing indication signal and the low side maximum ON time signal, and provide the low side control signal based on the low-side switch control signal, the zero-crossing indication signal and the low side maximum ON time signal.

15. The switching converter of claim 9, further comprising:
a mode selection circuit configured to provide a first mode signal and a second mode signal, wherein the first mode signal is configured to enable or disable the clock generator, and the second mode signal is configured to enable or disable the constant OFF time generator.

16. An integrated circuit, comprising: an input pin configured to receive an input voltage signal; an output pin configured to provide an output voltage signal; a high side switch; a low side switch; an error amplifying circuit configured to receive a voltage reference signal and a voltage feedback signal indicative of the output voltage signal, and to provide an error signal based on the voltage reference signal and the voltage feedback signal; a current comparing circuit configured to receive the error signal and a current sensing signal indicative of a current flowing to the output pin, and to provide a comparing signal to turn the high side switch OFF based on the error signal and the current sensing signal; a clock generator; and a constant OFF time generator; and wherein when an output terminal of the switching converter is coupled to a super capacitor, the clock generator is disabled, and the constant OFF time generator is enabled and configured to provide a constant OFF time signal to turn the high side switch ON; and wherein when the output terminal of the switching converter is coupled to a filtering capacitor, the constant OFF time generator is disabled, and the clock generator is enabled and configured to provide a clock signal to turn the high side switch ON; and wherein a value of the super capacitor is greater than one farad and a value of the filter capacitor is less than one farad.

17. The integrated circuit of claim 16, further comprising:
a mode selection pin configured to provide a first mode signal and a second mode signal, wherein the first mode signal is configured to enable or disable the clock generator, and the second mode signal is configured to enable or disable the constant OFF time generator.

18. The integrated circuit of claim 16, further comprising:
a zero-crossing comparing circuit configured to receive a zero-crossing threshold signal and the current sensing signal, and to provide a zero-crossing indication signal to turn the low side switch OFF based on the zero-crossing threshold signal and the current sensing signal.

19. The integrated circuit of claim 18, further comprising:
a low side maximum ON time generator, wherein when the output terminal of the switching converter is coupled to the super capacitor, the low side maximum ON time generator is enabled and configured to generate a low side maximum ON time signal to turn the low side switch OFF.

20. The integrated circuit of claim 19, further comprising:
a logic circuit configured to receive the comparing signal, the zero-crossing indication signal, the clock signal, the constant OFF time signal and the low side maximum ON time signal, and provide a high side control signal and a low side control signal to respectively control the high side switch and the low side switch.

* * * * *